(12) United States Patent
Adimatyam et al.

(10) Patent No.: US 9,137,475 B2
(45) Date of Patent: Sep. 15, 2015

(54) DIGITAL VIDEO RECORDER NOTIFICATIONS

(75) Inventors: Venkata S. Adimatyam, Irving, TX (US); Sameer Vasant Gavade, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 611 days.

(21) Appl. No.: 12/570,000

(22) Filed: Sep. 30, 2009

(65) Prior Publication Data

US 2011/0078744 A1    Mar. 31, 2011

(51) Int. Cl.
| | |
|---|---|
| H04N 5/445 | (2011.01) |
| H04N 5/782 | (2006.01) |
| H04N 21/41 | (2011.01) |
| H04N 21/4227 | (2011.01) |
| H04N 21/458 | (2011.01) |
| H04N 21/488 | (2011.01) |

(52) U.S. Cl.
CPC .......... *H04N 5/44513* (2013.01); *H04N 5/782* (2013.01); *H04N 21/4108* (2013.01); *H04N 21/4227* (2013.01); *H04N 21/4583* (2013.01); *H04N 21/4882* (2013.01)

(58) Field of Classification Search
CPC .......... H04N 21/4108; H04N 21/4227; H04N 21/4583; H04N 21/4882; H04N 5/44513
See application file for complete search history.

(56) References Cited

U.S. PATENT DOCUMENTS

| | | | |
|---|---|---|---|
| 2002/0092021 A1* | 7/2002 | Yap et al. | 725/55 |
| 2002/0166123 A1* | 11/2002 | Schrader et al. | 725/58 |
| 2006/0026648 A1* | 2/2006 | Kirihara et al. | 725/58 |
| 2007/0199040 A1* | 8/2007 | Kates | 725/134 |
| 2008/0184297 A1* | 7/2008 | Ellis et al. | 725/39 |
| 2009/0007184 A1* | 1/2009 | Nakamura et al. | 725/58 |
| 2009/0100478 A1* | 4/2009 | Craner et al. | 725/87 |
| 2009/0150925 A1* | 6/2009 | Henderson | 725/34 |
| 2010/0058416 A1* | 3/2010 | LaFreniere et al. | 725/110 |
| 2010/0158477 A1* | 6/2010 | Kummer | 386/83 |
| 2010/0215340 A1* | 8/2010 | Pettit et al. | 386/83 |

* cited by examiner

Primary Examiner — Rong Le (57) ABSTRACT

A method for providing notifications relating to a digital video recorder (DVR), may include identifying an issue or conflict associated with the DVR. It may be determined whether to generate a notification message relating to the identified issue or conflict. The notification message may be generated when it is determined to generate a notification message relating to the identified issue/conflict. The notification message may be transmitted to a user device separate from the DVR.

13 Claims, 6 Drawing Sheets

| DVR ID | ISSUE/CONFLICT | MSG. TYPE | RECIP. ADD. | FREQ/IMMED |
|---|---|---|---|---|
| 12345-1 | CANCEL | SMS | 703-123-1234 | IMMED |
| 12345-1 | EXTENDED | SMS, IM | 703-123-1234, jdoe71 | IMMED |
| 12345-2 | RESCHED. | EMAIL | jdoe@verizon.net | DAY |
| 12345-2 | SPACE | EMAIL | jdoe@verizon.net | DAY |
| 12345-1 | EXTENDED | SMS | 703-765-2345 | IMMED |

| DVR ID | ISSUE/CONFLICT | MSG. TYPE | RECIP. ADD. | FREQ/IMMED |
|---|---|---|---|---|
| 12345-1 | CANCEL | SMS | 703-123-1234 | IMMED |
| 12345-1 | EXTENDED | SMS, IM | 703-123-1234, jdoe71 | IMMED |
| 12345-2 | RESCHED. | EMAIL | jdoe@verizon.net | DAY |
| 12345-2 | SPACE | EMAIL | jdoe@verizon.net | DAY |
| 12345-1 | EXTENDED | SMS | 703-765-2345 | IMMED |

DIGITAL VIDEO RECORDER NOTIFICATIONS

BACKGROUND

Personal entertainment content, such as television programs, are becoming more plentiful and accessible. Digital video recorders (DVRs) or other similar recording devices enable users to identify and record programs for later viewing and enjoyment.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to devices, methods, and systems for facilitating the review of digital video recorder (DVR) operations via a device that is remote or separate from the DVR itself. For example, in some implementations, information regarding changes in DVR programming, scheduling conflicts, out-of-space notifications, etc. may be provided to a user via an mail message, a short message service (SMS) (e.g., "text") message, etc. In these implementations, the user is provided with the opportunity to adjust scheduled recordings or to reschedule missed or conflicted recordings. In some implementations, the notification may include a selectable option for facilitating programming changes on the DVR. For example, a provided email message may include an embedded option for rescheduling a recording for the next available occurrence of a missed program. As used herein, the terms "viewer" and/or "user" may be used interchangeably.

Figure 1:
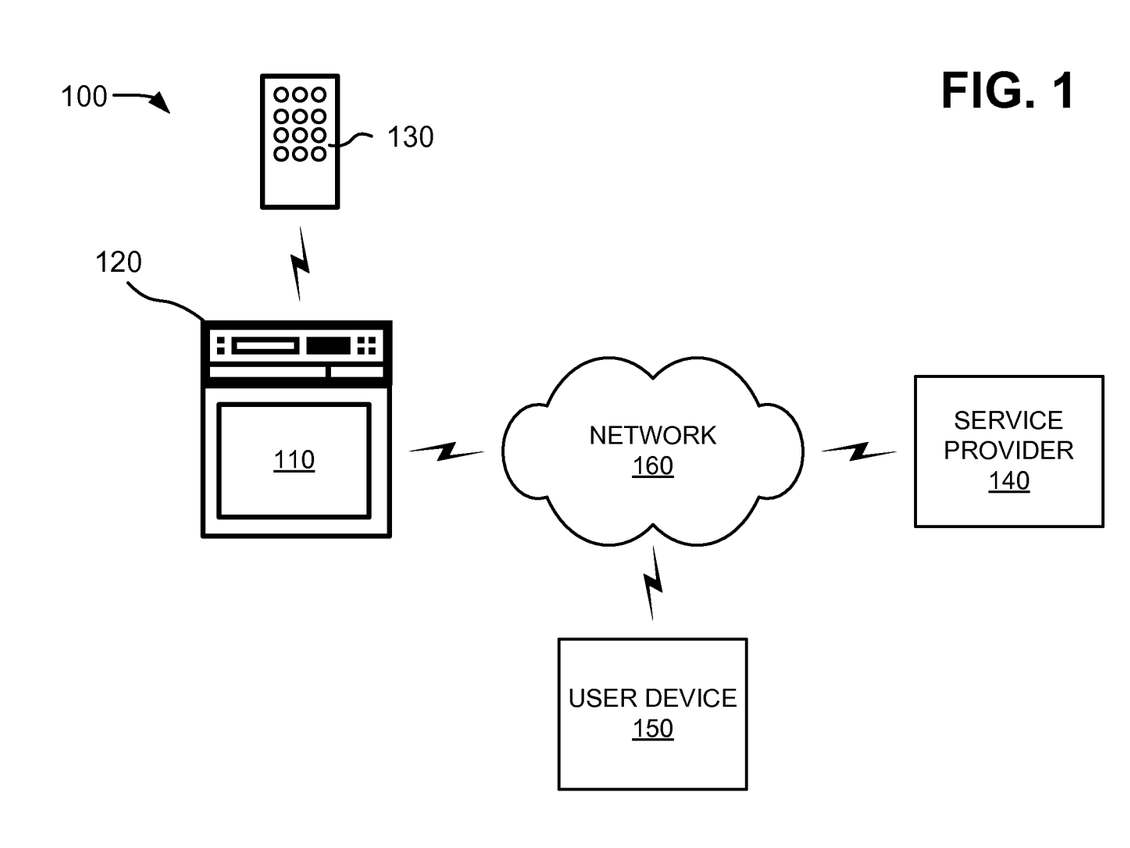
FIG. 1 depicts a diagram of an exemplary network in which systems and methods described herein may be implemented.

FIG. 1 is a diagram of an exemplary network 100 in which systems and methods described herein may be implemented. As illustrated, network 100 may include a television (TV) 110, a DVR 120, a remote control 130, a service provider 140 (e.g., a server), and a user device 150 interconnected by a network 160. Components of network 100 may interconnect via wired and/or wireless connections. For simplicity, a single television 110, DVR 120, remote control 130, service provider 140, user device 150, and network 160 have been illustrated in FIG. 1. In practice, there may be more televisions 110, DVRs 120, remote controls 130, service providers 140, user devices 150, and/or networks 160. Also, in some instances, one or more of the components of network 100 may perform one or more functions described as being performed by another one or more of the components of network 100. For example, television 110 may include components and functionality typically associated with DVR 120.

Television 110 may include any suitable display device capable of displaying television programming, content provided by DVR 120, and/or content provided by other devices (e.g., a digital video disk (DVD) player, a video camera, a home media player, etc., not shown) connected to television 110. Alternatively, television 110 may take the form of a PDA, a mobile phone, or any device with a display for viewing content.

DVR 120 may include a device or combination of devices that receives television programming (e.g., from service provider 140), selectively records the received programming video in a digital format to a disk drive or other memory associated with DVR 120, and provides the television programming (e.g., live or recorded) to television 110 or another device. In some implementations, DVR 120 may record the received programming to a remote storage location via, e.g., network 160 that is located within the customer premises or outside of the customer premises. For example, DVR 120 may record the received programming to a storage device separate from DVR 120, such as a network attached storage (NAS) device, an external serial ATA (eSATA) device, a remote storage (RS) server device, a networked computer, a networked DVR, etc. DVR 120 may allow a user to alter the programming provided to television 110 and/or scheduled for recording based on a signal from remote control 130. In one exemplary implementation, features of DVR 120 (e.g., a hard disk drive, scheduling components, etc.) may be incorporated directly within television 110.

Remote control 130 may include a device that allows a user to control functionality associated with DVR 120 and/or television 110. For example, remote control 130 may facilitate user control of programming and/or content displayed on television 110 via interaction with DVR 120. Furthermore, remote control 130 may enable interaction with the scheduling and notification services described in additional detail below.

Service provider 140 may include one or more server entities, or other types of computation or communication devices, that gather, process, search, and/or provide information in a manner described herein. In one implementation, service provider 140 may include a server (e.g., a computer system or an application), a cable head-end, or a broadcaster capable of providing content (e.g., TV programming, movies, on-demand services, live television, news feeds, blog feeds, advertisements, instructions, codes, encryption keys, and/or other information associated with products and/or services, etc.), to DVR 120. In some implementations, service provider 140 may be configured to receive information from and/or provide information to DVR 120 or user device 150 in the manner described below.

User device 150 may include a radiotelephone (e.g., a cellular telephone), a "smartphone" device (e.g., that may combine a cellular telephone with data processing and data communications capabilities), a personal digital assistant (PDA) (e.g., that can include a radiotelephone, a pager, Internet/intranet access, etc.), a laptop or notebook computer, a personal computer, an ultra mobile personal computer (UMPC), a netbook, or other types of computation or communication devices, threads or processes running on these devices, and/or objects executable by these devices. In one implementation, user device 150 may include any device (e.g., an Internet Protocol (IP)-based device) that is capable of accessing service provider 140 via network 160. In other implementations, user device 150 may be configured to interact with DVR 120 or television 110, via a local network different than network 160 (e.g., a home wired or wireless network).

Network 160 may include a local area network (LAN), a wide area network (WAN), a metropolitan area network (MAN), a telephone network, such as the Public Switched Telephone Network (PSTN), an intranet, the Internet, an optical fiber (or fiber optic) network, or a combination of networks.

Figure 2:
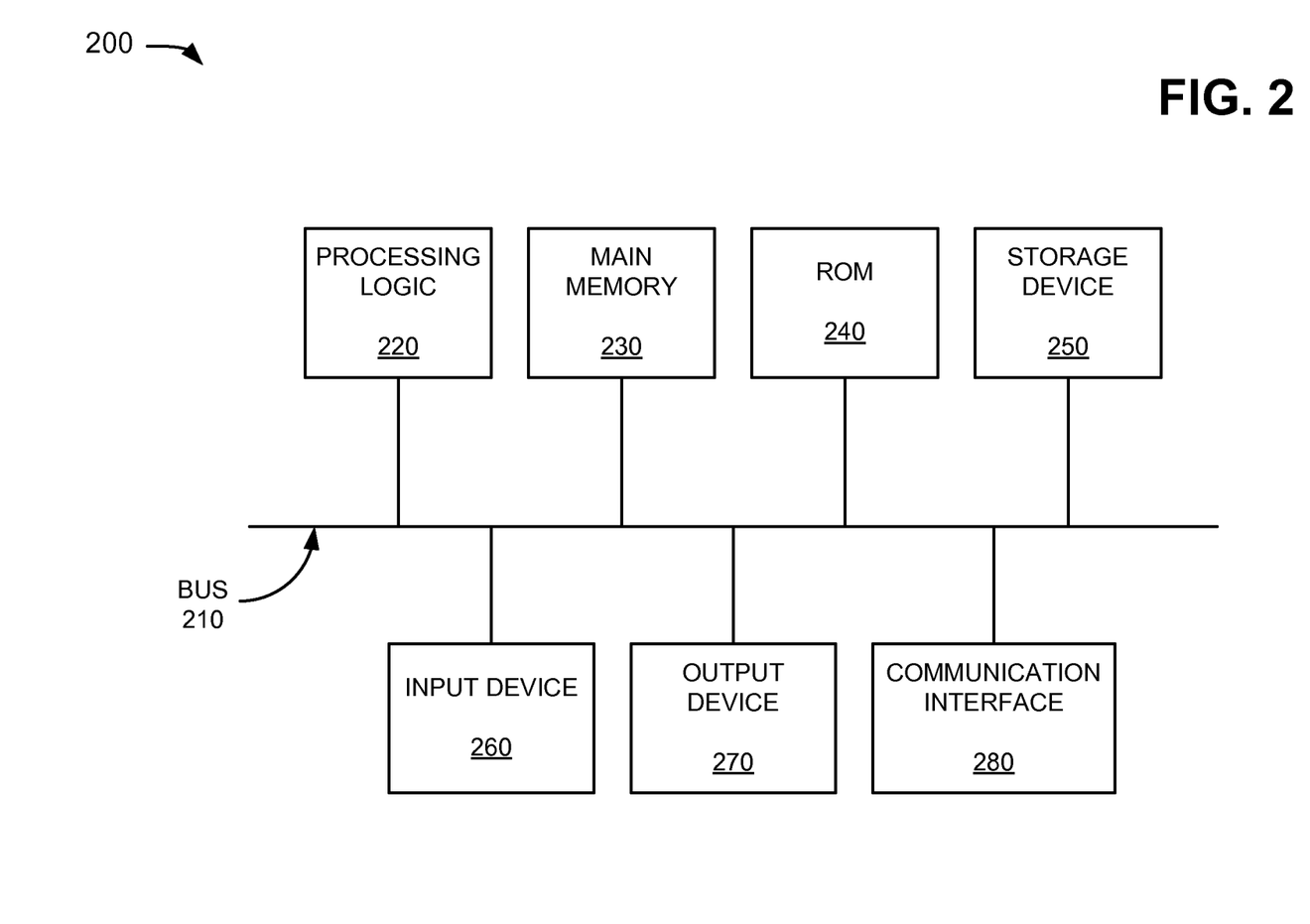
FIG. 2 illustrates exemplary components of a device that may correspond to the television, digital video recorder (DVR), service provider, and/or user device of the network depicted in FIG. 1.

FIG. 2 is an exemplary diagram of a device 200 that may correspond to any of DVR 120, service provider 140, and/or user device 150. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive. In one implementation storage device 250 may be configured to store television programming received by DVR 120.

Input device 260 may include a mechanism that permits an operator to input information to device 200, such as a keyboard, a mouse, a pen, a microphone, voice recognition mechanisms, a remote control (e.g., remote control 130), etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may include a physical or logical memory device. The software instructions may be read into main memory 230 from another computer-readable medium, such as storage device 250, or from another device via communication interface 280. The software instructions contained in main memory 230 may cause processing logic 220 to perform processes described herein. Hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
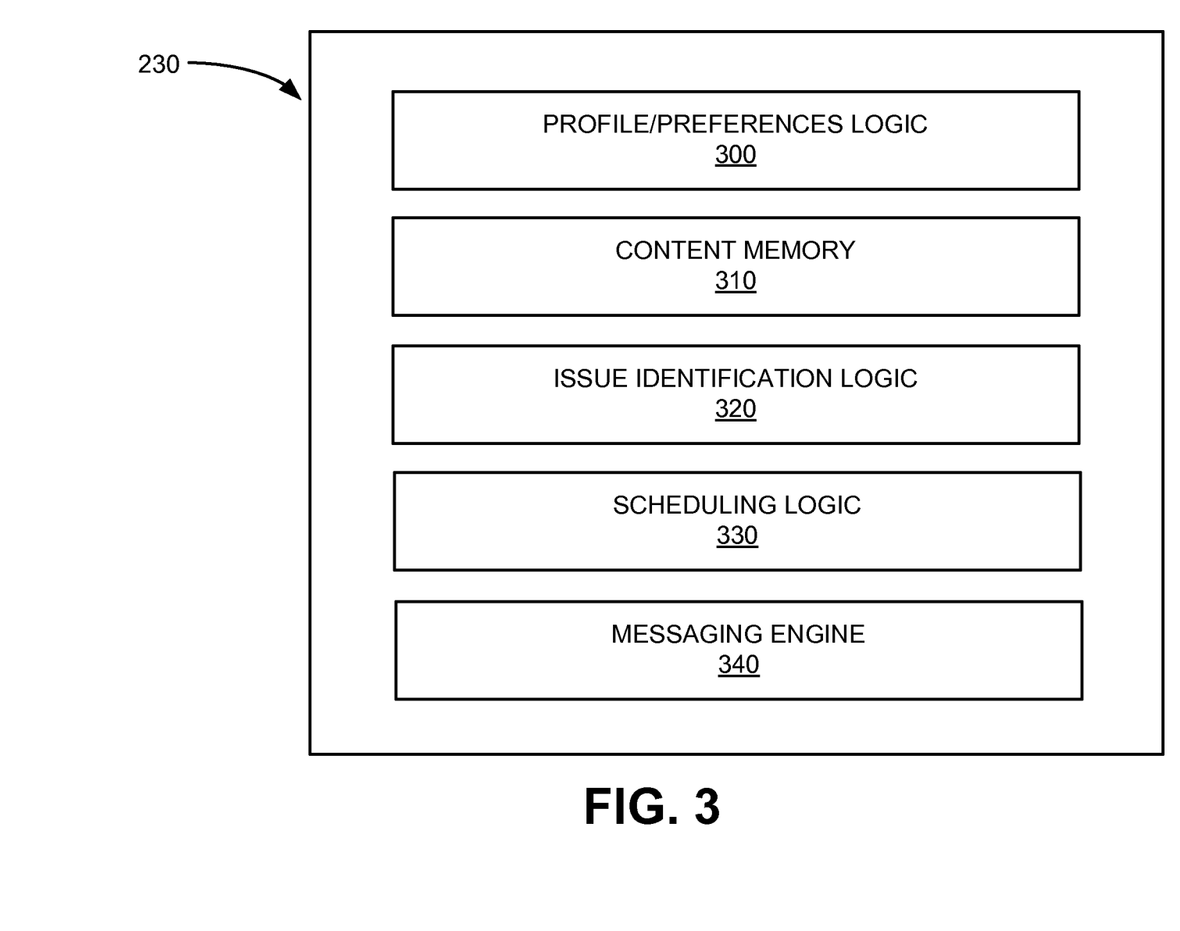
FIG. 3 is an exemplary functional block diagram of components implemented in the DVR and/or television of FIG. 1.

FIG. 3 is an exemplary functional block diagram of components in DVR 120 and/or television 110 of FIG. 1. In an exemplary implementation, all or some of the components illustrated in FIG. 3 may be stored in memory 230. For example, referring to FIG. 3, memory 230 may include profile/preference logic 300, content memory 310, issue identification logic 320, scheduling logic 330, and messaging engine 340. In addition, some logic components illustrated in FIG. 3 may be implemented by processing logic 220 executing one or more programs stored in memory 230.

Profile/preference logic 300 may include logic configured to receive information corresponding to notifications associated with one or more users. For example, profile/preference logic 300 may be configured to receive notification preference information from one or more users of DVR 120, such as a selection of criteria for generating notifications, a frequency/immediacy associated with generation and/or transmission of notification messages, and notification type (e.g., SMS message, email message, etc.).

In one implementation, notification preference information may be explicitly received from a user, such as an account holder. For example, profile/preference logic 300 may provide an interface (e.g., an on screen display (OSD), web server, interactive voice response system, call center, etc.) for receiving notification preferences from the user. Such an interface may query the user for various elements of notification preference information. For example, in an OSD implementation, a user may select from a set of available notification triggering criteria. That is, the user may select the circumstances, the identification of which will cause DVR 120 to generate and transmit a notification. Exemplary notification triggering criteria may include an out-of-recording-space warning, a recording-canceled warning, a programming change resulting in recording conflict, etc.

The provided interface may also receive an indication of a frequency/immediacy associated with generation and/or transmission of notifications as well as a type of notification message to transmit. For example, in one implementation, the user may select an immediate notification, a daily notification, an every-other-day notification, a weekly notification, etc. Furthermore, the user may select from a number of available notification message types, such as email messages, SMS messages, etc. In some instances, a user may select different notification types for different triggering criteria. For example, a user may select immediate SMS notification for out-of-space warnings and canceled-recording notifications and may select daily email messages for programming-change notifications and conflict notifications. The notification preference information may also include address information (e.g., an email address, a phone number, etc.) for each selected notification type and/or triggering criteria.

The received notification preference information may be stored, for example, in content memory 310 of DVR 120 for subsequent retrieval by issue identification logic 320. Content memory 310 may include one or more memories, such as a hard disk drive (HDD), solid state drive (SSD), random access memory (RAM), read only memory (ROM) or another memory that stores the above-described notification preference information upon generation by profile/preference logic 300. For example, in one implementation, content memory 310 may include a database of entries corresponding to one or more notification generation rules associated with the notification preferences information.

In one implementation, each entry in the database may include an issue identifier, a message frequency/immediacy identifier, and a message type identifier. Further, for accounts having more than one DVR 120, notification generation rules may include a DVR identifier, or more than one identifier for accounts having more than one DVR associated therewith.

Although illustrated as part of DVR 120 or television 110, in an alternative implementation, content memory 310 may include a memory structure remote from DVR 120 or television 110, such as a remote database, web server, or the like. For example, content memory 310 may be stored at a remote server configured to periodically receive notification preference information from DVR 120 or user device 150 via a network, such as network 160. In such an implementation, issue identification logic 320 may request the notification preference information from content memory 320 via network 160.

Issue identification logic 320 may include logic configured to monitor conditions associated with DVR 120 and identify whether the monitored conditions match one or more of the notification triggering criteria included in the notification preference information. In some implementations, issue identification logic 320 may monitor conditions associated with other devices associated with DVR 120, such as attached storage devices, networked storage devices, etc. If issues matching the received notification triggering criteria are identified, the issues and their corresponding preferences may be forwarded to messaging engine 340.

For example, issue identification logic 320 may monitor available storage capacity on DVR 120 and may compare the available storage capacity to storage capacity needed for upcoming programming. Issue identification logic 320 may also determine whether a scheduled recording has been canceled (e.g., via manual user interaction with DVR 120). In addition, issue identification logic 320 may retrieve program guide information and may determine whether a date/time for a scheduled recording conflicts with other scheduled recordings. If so, scheduling logic 330 may be configured to analyze the program guide information to identify alternate showings associated with one or more of the conflicted recordings.

In one exemplary implementation, DVR 120 may be configured to periodically receive program guide information from service provider 140 (e.g., a broadcaster, cable company, etc.) relating to television programming available for viewing/recording. The received program guide information may include scheduling and descriptive information relating to content to be received by DVR 120 for a predetermined period of time. For example, DVR 120 may receive updated program guide information on an hourly or daily basis.

The program guide information may be provided to a user, upon command, as a program guide or menu. In one implementation, the program guide may include a grid-like arrangement of the program information corresponding to a selected time slot. Selection of a particular program displayed in the program guide may result in DVR 120 immediately navigating to the selected channel, or, for future programming, may trigger an inquiry regarding whether the user wishes to set DVR 120 to record the program or to change channels at the program time.

In one implementation, the received program guide information may associate program data based on channel identifiers. For example, the received program guide information may include an entry indicating that "Judge Judy" is broadcast on channel 404 (the channel identifier) from 4:00 PM to 4:30 PM on Mar. 3, 2009. The program guide information entry may also include additional program information, such as genre, rating, a brief plot synopsis, etc. DVR 120 may store this information (e.g., in a table or other suitable memory structure) in memory 230, for example. For previously recorded content (stored, e.g., in storage device 250), the program guide information corresponding to the recorded program may be stored and associated with the recorded program, in order to provide identification information to the user.

Returning to FIG. 3, issue identification logic 320 may identify possible extended-duration programs currently being recorded (or scheduled for recording), such as awards shows, sports programming, etc. Issue identification logic 320 may determine extended-duration programs based on information received from, for example, service provider 140 or via network 160 (e.g., a website or other resource). The obtained extended-duration programming information may be forwarded to messaging engine 340.

Any identified conflicts or issues may be compared to the notification preference information received by profile/preference logic 300 and described above. For example, when issue identification logic 320 determines that a previously scheduled recording has been canceled, it may be determined whether the notification preference information includes a canceled-recording notification and, if so, the selected frequency/immediacy and type of notification message to be sent. In one example, the notification preference information may indicate that the user selected to be notified in the event of a canceled recording via immediate SMS or instant message (IM), etc.

As described above, scheduling logic 330 may include logic configured to analyze program guide information received, for example, from service provider 140, and identify alternate showings associated with one or more of the conflicted recordings. For example, issue identification logic 320 may determine that a 10 PM showing of "Law and Order" scheduled for recording on channel 404 on Sep. 2, 2009 has been moved to 9 PM on Sep. 3, 2009 placing it in conflict with two other programs being recorded in that time slot: "Rides" on channel 424, and "Cold Case" on channel 409. Assume that, in this example, DVR 120 may record a maximum of two programs simultaneously. In this example, because DVR cannot record the show, scheduling logic 330 may examine the program guide information for other occurrences of any of these programs. If an alternative occurrence of a program is identified, this information may be passed to messaging engine 340.

Messaging engine 340 may include logic configured to generate and transmit notification messages corresponding to identified issues and notification preference information. In some implementations, messaging engine 340 may be configured to transmit messages directly to user device 150 via network 160. In other implementations, messages may be routed or delivered via service provider 140, depending on the capabilities of DVR 120. The content of transmitted notification messages may be based on the type of issue identified by issue identification logic 320. For example, a recording-cancellation message may provide a notice to the user regarding the name of the canceled recording as well as an option for rescheduling or resuming the recording. Similarly, a programming-conflict notification may include an option for rescheduling a recording for one or more of the conflicting recordings. An out-of-space notification may provide an option for selecting one or more previously recorded programs on DVR 120 to be deleted. An extended-duration programming notification may include an option for extending the recording time for the program.

Figure 4:
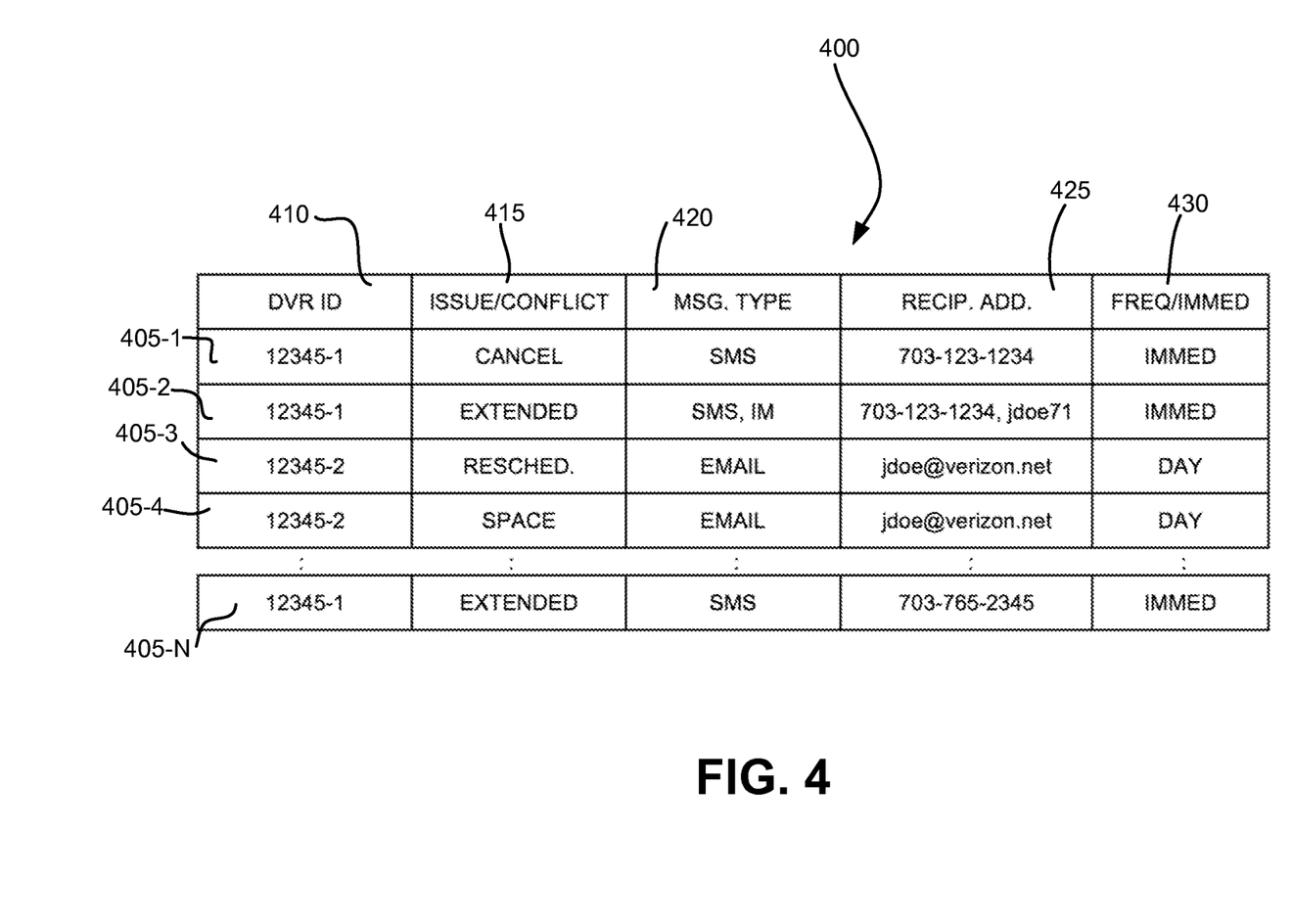
FIG. 4 illustrates a structure of an exemplary database for storing notification preference information received and/or generated by the profile/preference logic of FIG. 3.

FIG. 4 illustrates a structure of an exemplary database 400 for storing notification preference information received and/or generated by profile/preference logic 300. As described above, database 400 may be stored in content memory 320. Referring to FIG. 4, database 400 may include a number of notification generation rules 405-1 to 405-N (collectively "rules 405" or individually "rule 405"). Each rule 405 corresponds to a different type of issue/conflict corresponding to a particular DVR or account having multiple DVR's.

In an exemplary embodiment, each notification generation rule entry 405 may include a DVR identifier field 410, an issue/conflict identifier field 415, a notification message type identifier field 420, a recipient address field 425, and a frequency/immediacy identifier field 430. As described above, profile/preference logic 300 may receive or otherwise obtain the notification preference information from a user via an interface on DVR 120 or user device 150, or, alternatively, from service provider 140. Additionally, in some implementations, each field 410-430 in rules 405 may include a plurality of fields. For example, recipient address field 425 may include a plurality of fields, each including a different address.

DVR identifier field 410 may include an identifier corresponding to a particular DVR 120 associated with a user's account. For example, DVR identifier field 410 may include a name associated with the DVR associated with the rule, such as "Family Room" or "John's Room." Issue/conflict identifier field 415 my include an identifier that designates the type of issue or recording conflict being monitored. For example, issue/conflict identifier field 415 in rule 405-1 may include a "CANCEL" identifier, indicating that the rule relates to canceled recordings. Other issue/conflict identifiers may include "EXTENDED," corresponding to extended-programming rules, "RESCHED," corresponding to rescheduled programming, and "SPACE," corresponding to out-of-space rules. It should be understood that these identifiers are exemplary only and that any suitable identification scheme may be used to represent different types of recording issues or conflicts. For example, individual notification generation rules may be associated with activities relating to particular users, dates/times, show names/identifiers, channel numbers, etc. In this manner, rules particularly configured to relay specific information may be established.

Notification message type identifier field 420 may include an identifier corresponding to the type of notification message to be sent in the event of an identified issue/conflict. Exemplary message types may include email, SMS, MMS, instant message, etc.

Recipient address field 425 may include one or more addresses corresponding to a recipient of a generated notification message of the type indicated in notification message type identifier field 420. Suitable address values in field 425 may include email addresses, telephone numbers, instant message usernames, etc.

Frequency/immediacy identifier field 430 may include an identifier corresponding to a frequency or timeframe in which notification messages corresponding to the rule are sent. For example, a frequency/immediacy identifier of "IMMED" may indicate that a notification message according to the particular rule is to be sent immediate upon identification. Another suitable frequency/immediacy identifier may include "DAY," indicating that the corresponding notification message is to be sent at a predetermined time, once per day, such as at the end of the day. Other frequency/immediacy identifiers may include "WEEK," "E.O.D" (every other day), etc.

Figure 5:
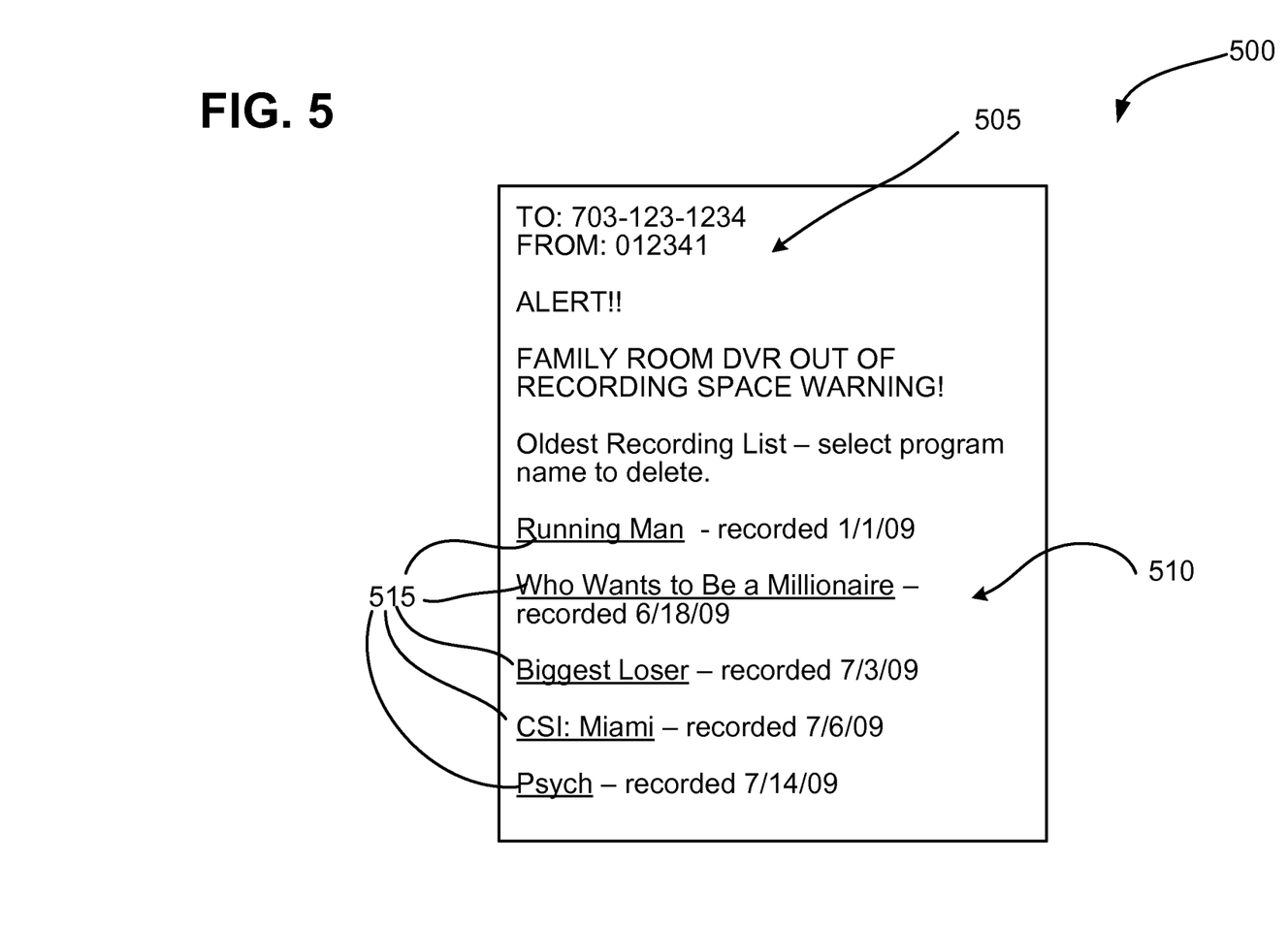
FIG. 5 illustrates a diagram of an exemplary notification message transmitted by the DVR and/or service provider of FIG. 1.

FIG. 5 illustrates a diagram of an exemplary notification message 500 transmitted to user device 150 by DVR 120, and/or service provider 140. As described above, notification messages may include static information and/or may include selectable interface (e.g., interactive) elements for enabling a user to modify recording and/or scheduling on DVR 120. The selectable interface elements may receive user inputs via one or more input devices (e.g., input device 260), such as receiving user clicks or button presses. Receipt of such inputs may cause messages to be transmitted back to DVR 120, the receipt of which may cause corresponding actions to be performed by DVR 120.

As illustrated in FIG. 5, notification message 500 may include an information portion 505 and a control portion 510. Information portion 505 may include information relating to the nature of notification message 500. As depicted in FIG. 5, notification message 500 relates to an out of space warning message. Accordingly, information portion 505 may include information indicating that the user's family room DVR is running out of space and will not be able to record the upcoming recordings without freeing up some space. Control portion 510 of notification message 500 may include one or more selectable content elements 515 for enabling the user to control operation or scheduling of DVR 120. For example, selectable control elements 515 may provide the user with a listing of DVR 120's oldest recorded programs (e.g., the 5 oldest programs) with delete options provided next to each listed program. Consistent with implementations described herein, upon user selection of one or more of the delete options, a message or signal may be transmitted from user device 150 to DVR 120, instructing DVR 120 to delete to corresponding program or programs.

In an alternative implementation, rather than providing control options directly within notification message 500, selectable control elements 515 in control portion 510 may include a link to a web server address corresponding to DVR 120 programming options may be provided. For example, service provider 140 may provide a web interface for controlling DVR 120 via network 160. In this implementation, control portion 510 of notification message 500 may include a link to a portion of the web interface relating to deleting stored programs on DVR 120.

Other types of notification messages, such as scheduling-conflict messages, canceled-recording messages, etc. may include similar control portions 510 for enabling users to control recording and recording scheduling on DVR 120 in response to notification message 500 at user device 150. As described above, where appropriate, scheduling logic 330 may include logic configured to analyze program guide information received, for example, from service provider 140, and identify alternate showings associated with one or more of the conflicted recordings. Information regarding the identified alternate showings may be provided in control portion 510, along with elements facilitating selection of one or more of the identified alternate showings for recording.

Figure 6:
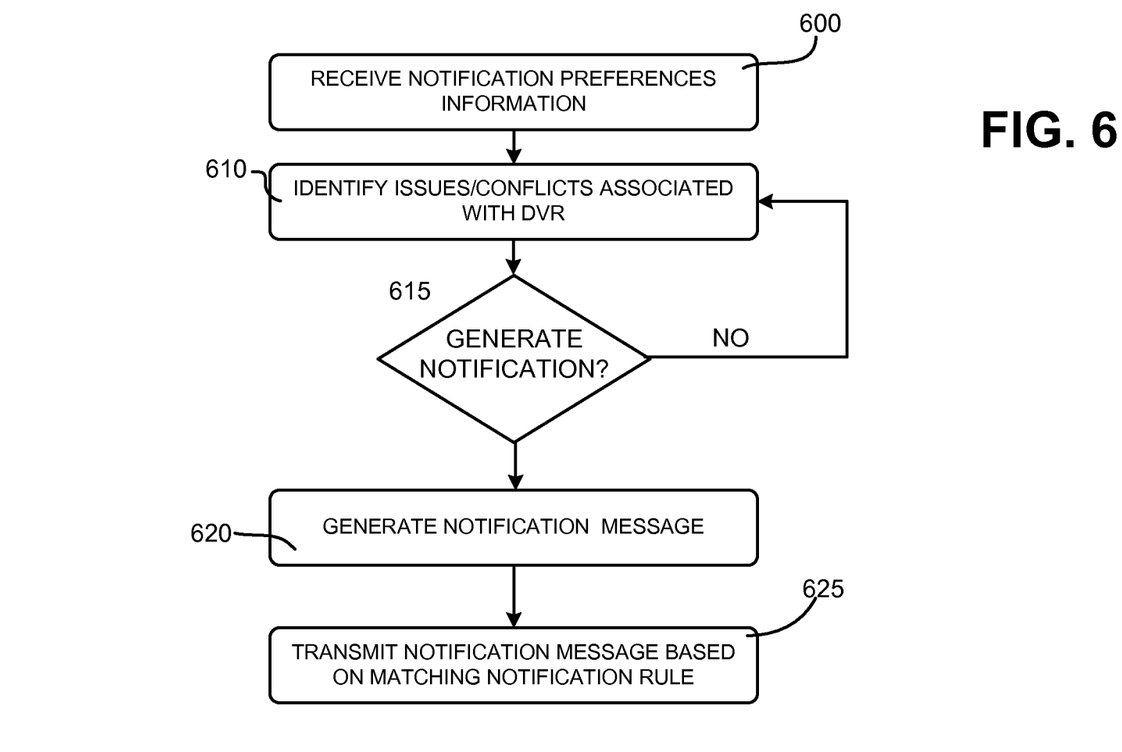
FIG. 6 illustrates a flow chart of exemplary processes according to implementations described herein.

FIG. 6 is a flow diagram illustrating exemplary processing associated with the generating and providing DVR notification messages. Processing may begin with DVR 120 and/or service provider 140 (e.g., profile/preference logic 300) receiving notification preference information including the conditions that cause generation/transmission of notifications (block 600). As described above, exemplary notification preference information may define one or more notification rules that include selection of the types of issues/conflicts to be notified about, the manner or type of the notifications, and the frequency/immediacy of the notifications. For example, profile/preference logic 300 may receive information defining a notification rule indicating that out-of-space notifications should be sent as a daily email to johndoe@verizon.net and that recording-cancellation notifications should be sent immediately as an SMS message to telephone number 703-555-0123.

Once notification preferences have been received, DVR 120 may monitor recording, programming, and storage space conditions associated with DVR 120 to determine occurrences of any issues/conflicts (block 610). For example, issue identification logic 320 may periodically compare available storage space in storage device 250 against estimated space requirements for upcoming recordings (e.g. recording in the next 1-2 days). Additionally, issue identification logic 320 may retrieve program guide information (e.g., from service provider 140 or memory 230) and compare programming times for upcoming recordings to determine whether changes to programming times have introduced a recording conflict (e.g., more simultaneous recordings scheduled than may be accommodated by DVR 120).

Issue identification logic 320 may also determine when a previously scheduled recording is manually cancelled (e.g., by a user of DVR 120). Issue identification logic 320 may also determine whether a run time associated with a currently recording (or scheduled) program will likely exceed its scheduled program window (e.g., a sporting event or award show) or whether affects of prior programming changes not reflected in the programming guide will affect a programming window for a scheduled recording. For example, issue identification logic 320 may determine that a start time for "Cold Case" has been pushed back by 20 minutes because of an earlier football game. Adjustments to programming guide information do not typically occur rapidly enough to ensure accurate recording times. In this embodiment, issue identification logic 320 may use information retrieved, e.g., from service provider 140 or other network resources to identify potential changes caused by extended programming.

Upon an identification of an issue/conflict, issue identification logic 320 may determine whether the received notification preference information indicates that a notification should be generated corresponding to the identified issue/conflict (block 615). For example, issue identification logic 320 may compare the identified issue/conflict to the received notification preference information to determine whether a corresponding notification rule has been established. When it is determined that a corresponding notification rule has not been established (block 615—NO), processing may return to block 610 for identification of additional issues/conflicts.

However, when it is determined that a notification rule 405 corresponding to the identified issue/conflict has been established (block 615—YES), messaging engine 340 may generate a notification message corresponding to the matching notification rule 405 (block 620). As described above, depending on the type of issue/conflict identified as well as the type of notification message associated with the matching notification rule 405 (e.g., email message, SMS, etc.), DVR 120 may provide different types of information in the notification message. For example, when a programming conflict or recording cancellation has been identified, scheduling logic 330 may determine alternate, future, showings of the conflicted or cancelled programs. Information relating to the identified alternate showings may be provided in the notification message. Alternatively, for out of space warning notifications, the notification message may include information relating to suggested programs to be deleted.

As described above, in one exemplary implementation, notification messages (e.g., notification message 500) may include selectable content elements for enabling users to modify the programming/scheduling of DVR 120 in relation to the provided message. For example, an out-of-space notification message may include an option to delete one or more stored programs on DVR 120. Alternatively, for an identified cancelled or conflicted recording, the notification message may include an option to reschedule the recording for an available future programming time. For an extended-programming warning, the notification message may include an option to extend or modify the recording window for a scheduled recording.

The generated notification message may be transmitted at a time identified in the matching notification rule 405 (block 625). For example, if frequency/immediacy field 430 in matching notification rule 405 indicates that a corresponding notification message is to be sent immediately, messaging engine 340 may transmit the notification message substantially immediately upon generation. However, if frequency/immediacy field 430 indicates that the notification message is to be sent at a predetermined time of day (e.g., 4:30 PM), messaging engine 340 may queue the notification message for later transmission.

In an alternative implementation, multiple notification messages queued for later, simultaneous transmission by messaging engine 340 may be aggregated into a message digest. In this implementation, a single notification message may be configured to include more than one notification.

Implementations described herein relate to devices, methods, and systems for facilitating the identification of DVR-related issues and generation of corresponding notification messages. In some implementations, generated notification messages may be delivered via email, SMS, or instant message and may include selectable elements for enabling message recipients to reschedule recordings or control the operation of DVR via a user device that is remote from the DVR, such as a mobile phone or computer.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a DVR or television performing issue/conflict identification, and notification message generation/transmission. In other implementations, features described herein may be implemented mainly in one or more devices remote from the DVR or television, such as by a remote server application (such as service provider 140).

Further, while series of blocks have been described with respect to FIG. 6, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limited. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for providing notifications relating to a digital video recorder (DVR), comprising:
    identify an extended duration program corresponding to a scheduled recording or a current recording on the DVR;
    wherein identifying the extended duration program is based on extended duration program information received from a remote resource different than a source of an electronic program guide;
    determining whether to generate a notification message relating to the identified extended duration program based on the stored notification preference information;
    generating the notification message when it is determined to generate the notification message relating to the identified extended duration program,
    wherein generating the notification message is based on notification preference information that comprises one or more notification rules, where each of the notification rules defines an issue/conflict, a notification message type, and a frequency/immediacy,
    wherein the notification message includes a graphical interface having one or more selectable content elements for enabling a recipient of the notification message to control operation or scheduling of the DVR,
    wherein the selectable content element includes a button or option, wherein selection of the button or option by interaction with an input device, automatically causes the recording of the extended duration program to be extended based on the received extended duration program information, and
    wherein the selectable control element further comprises a link to a web server address corresponding to the DVR; and
    transmitting the notification message to at least one of a mobile device or email address associated with the DVR.

2. The method of claim 1, further comprising:
    receiving the notification preference information indicating issues or conflicts in response to which a notification message is generated,
    wherein the notification preference information includes at least an indication that a notification message is to be generated in response to the identification of the extended duration program.

3. The method of claim 1, wherein the notification message type for each of the one or more notification rules comprises at least one of: an email message, a text (short message system) message, or an instant message.

4. The method of claim 1, wherein the frequency/immediacy for each of the one or more notification rules comprises at least one of: substantially immediately, or daily at a particular time.

5. The method of claim 1, wherein determining whether to generate the notification message comprises determining whether the identified issue/conflict matches at least one of the one or more notification rules.

6. The method of claim 5, wherein generating the notification message further comprises:
    retrieving the notification message type from the matching notification rule; and
    generating the notification message based on the retrieved notification message type.

7. The method of claim 1, wherein the notification message includes information relating to the extended duration program.

8. The method of claim 7,
    wherein the selectable content element includes an option to extend the duration of the recording by a predetermined amount.

9. The method of claim 1, wherein the notification message is transmitted to the mobile device or email address associated with the DVR via a service provider.

10. The method of claim 1, wherein the mobile device comprises a mobile phone or a personal computer.

11. A recording device, comprising:
    a communication interface to receive television content, wherein the communication interface exchanges information with at least one of a mobile device or a computer device separate from the recording device;
    a memory for storing notification preference information, wherein the notification preference information indicates issues/conflicts in response to which a notification message is generated, and
    wherein the notification preference information further comprises one or more notification rules, where each of the notification rules defines an issue/conflict, a notification message type, and a frequency/immediacy; and
    one or more processors to:
        identify an issue/conflict associated with the recording device,
        wherein the issue/conflict includes identification of an extended duration program corresponding to a scheduled recording or a current recording;
        wherein identification of the extended duration program is based on extended duration program information received from a remote resource different than a source of an electronic program guide;
        determine whether to generate a notification message relating to the identified extended duration program based on the stored notification preference information;
        generate the notification message when it is determined to generate the notification message relating to the identified extended duration program,
        wherein the notification message includes a selectable content element for enabling a recipient of the notification message to control operation or scheduling of the DVR,
        wherein the selectable content element includes button or option, wherein selection of the button or option by interaction with an input device, automatically causes the recording of the extended duration program to be extended based on the received extended duration program information,
        wherein the selectable control element further comprises a link to a web server address corresponding to the DVR; and
        transmit the notification message to the mobile device or the computer device via the communication interface.

12. The recording device of claim 11, wherein the one or more processors to determine whether to generate the notification message comprises further comprises one or more processors to determine whether the identified issue/conflict matches at least one of the one or more notification rules.

13. A non-transitory computer-readable medium having stored thereon sequences of instructions which, when executed by at least one processor, cause the at least one processor to:
  receive notification preference information,
  wherein the notification preference information indicates issues/conflicts in response to which a notification message is generated,
  wherein the notification preference information further comprises one or more notification rules, where each of the notification rules defines an issue/conflict, a notification message type, and a frequency/immediacy,
  wherein at least one of the issues/conflicts includes identification of an extended duration program corresponding to a scheduled recording or a current recording
  identify the extended duration program based on extended duration program information received from a remote resource different than a source of an electronic program guide;
  determine whether to generate a notification message relating to the identified extended duration program based on the notification preference information;
  generate the notification message when it is determined to generate the notification message relating to the identified extended duration program,
  wherein the notification message includes a graphical interface having one or more selectable content elements for enabling a recipient of the notification message to control operation or scheduling of the DVR,
  wherein the selectable content element includes an option, wherein selection of the option by interaction with an input device, automatically causes the recording of the extended duration program to be extended based on the received extended duration program information,
  wherein the selectable control element further comprises a link to a web server address corresponding to the DVR;
  transmit the notification message to a remote user device via a communication interface;
  receive a control message responsive to the transmitted notification message,
  wherein the control message indicates that the recording of the extended duration program is to be extended; and
  modify control and/or scheduling of the recording device based on the received control message.

\* \* \* \* \*